R. B. WEAVER.
WORM DRIVE REAR AXLE.
APPLICATION FILED NOV. 12, 1917.

1,268,192.

Patented June 4, 1918.
3 SHEETS—SHEET 1.

Inventor:
Robert B. Weaver,
by Carrot & Carrot
his Attys.

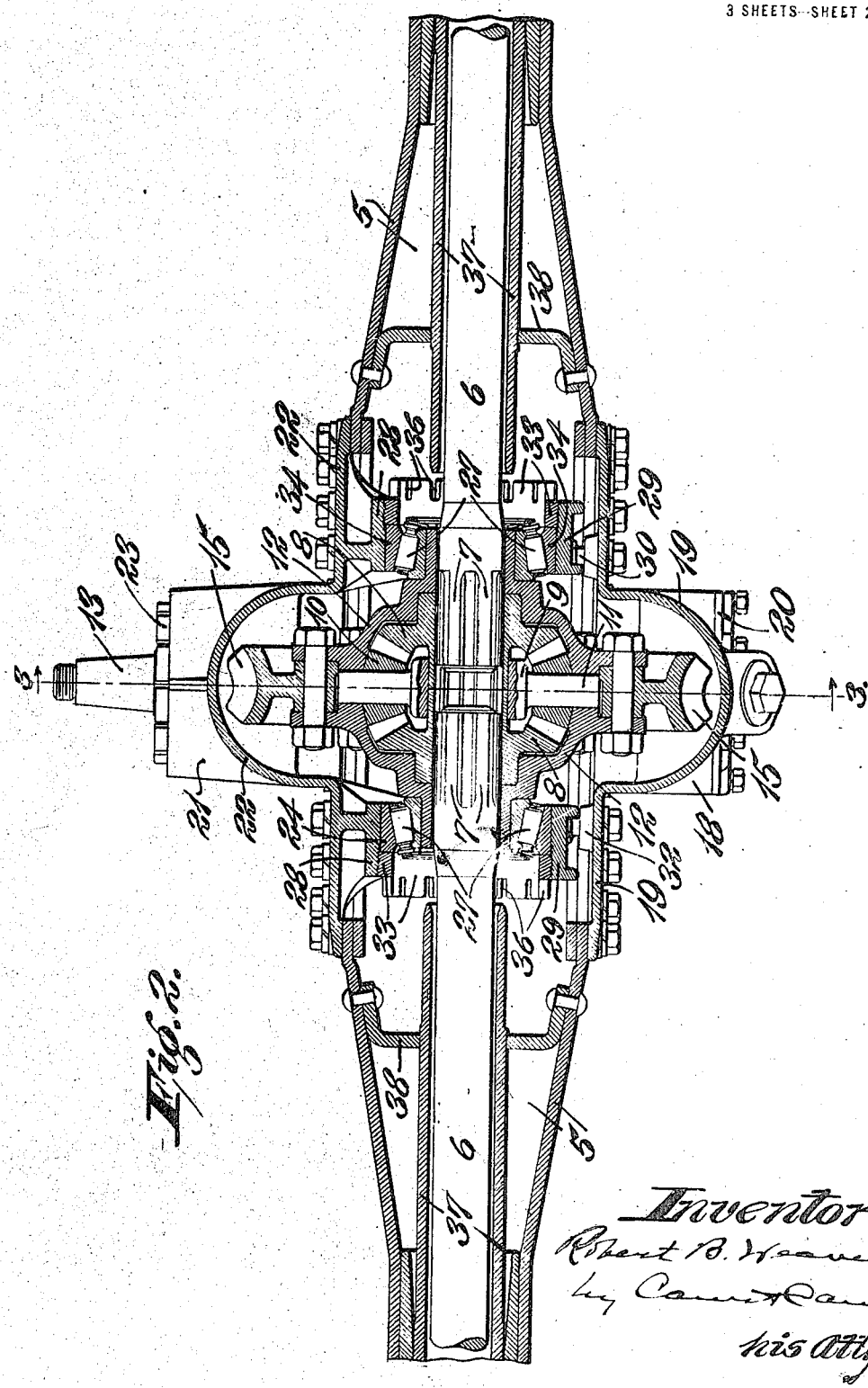

R. B. WEAVER.
WORM DRIVE REAR AXLE.
APPLICATION FILED NOV. 12, 1917.
1,268,192.
Patented June 4, 1918
3 SHEETS—SHEET 3.
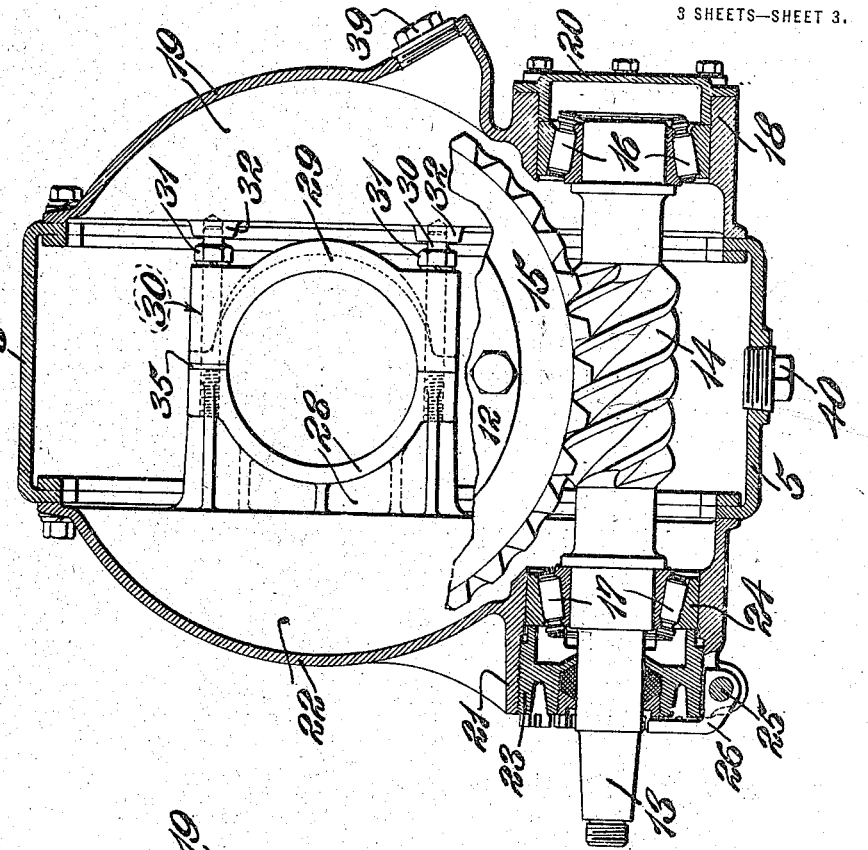
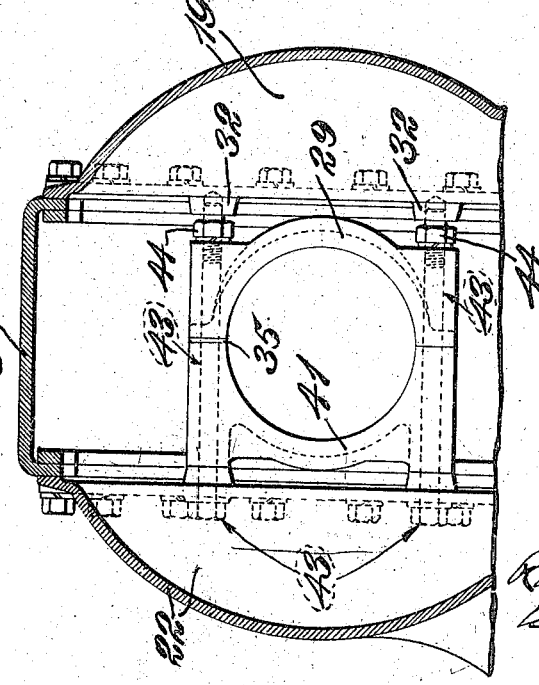
Inventor:
Robert B. Weaver
by Cannot + Cannot
his Attys

UNITED STATES PATENT OFFICE.

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

WORM-DRIVE REAR AXLE.

1,268,192.        Specification of Letters Patent.        Patented June 4, 1918.

Application filed November 12, 1917. Serial No. 201,458.

*To all whom it may concern:*

Be it known that I, ROBERT B. WEAVER, a citizen of the United States, and a resident of the city of Detroit, in the county of Wayne and State of Michigan, have invented a new and useful Improvement in Worm-Drive Rear Axles, of which the following is a specification.

This invention relates to worm drive rear axle constructions for motor vehicles and particularly to the manner of supporting the bearings for the worm shaft, worm wheel and differential.

One of the objects of the invention is to provide an oil-tight housing made of pressed or cast steel, which will completely inclose the worm, worm gear, the differential and their bearings. Another object is to provide a housing for the driving parts and their bearings, which will be accessible for inspection, repair or adjustment of these parts without removing the body of the vehicle or the axle from under the car. Another object is to provide a carrier having receptacles for the bearings, which support the differential, worm gear and one bearing for the worm shaft. Another object is to provide supports for the bearings, which support the differential and worm gear, which can be detachably secured to the main body of the carrier, thus permitting these parts to be machined and finished before being secured to the main body of the carrier.

The invention consists in a gear carrier arranged to rotatably support the inner ends of the driving axle and adapted to be secured to the axle casing of a motor vehicle, said carrier having bearing supports for the worm gear and differential, which may be made integral with the carrier or detachably secured thereto. The invention also consists in certain arrangements for supporting the worm shaft and its bearings. The invention further consists in the construction and combination of parts hereinafter described and claimed.

In the accompanying drawings, which form part of the specification and wherein like symbols refer to like parts wherever they occur, Figure 1 is a rear elevation of an axle embodying my invention, the right hand portion being shown in section;

Fig. 2 is a horizontal section taken on the line 2—2 in Fig. 1;

Fig. 3 is a vertical cross-section on the line 3—3 in Fig. 2, parts being broken away to disclose the support for the bearings for the worm wheel and differential;

Fig. 4 is a section similar to Fig. 3 showing a modified form of support for the worm wheel and differential bearings.

Figure 1:
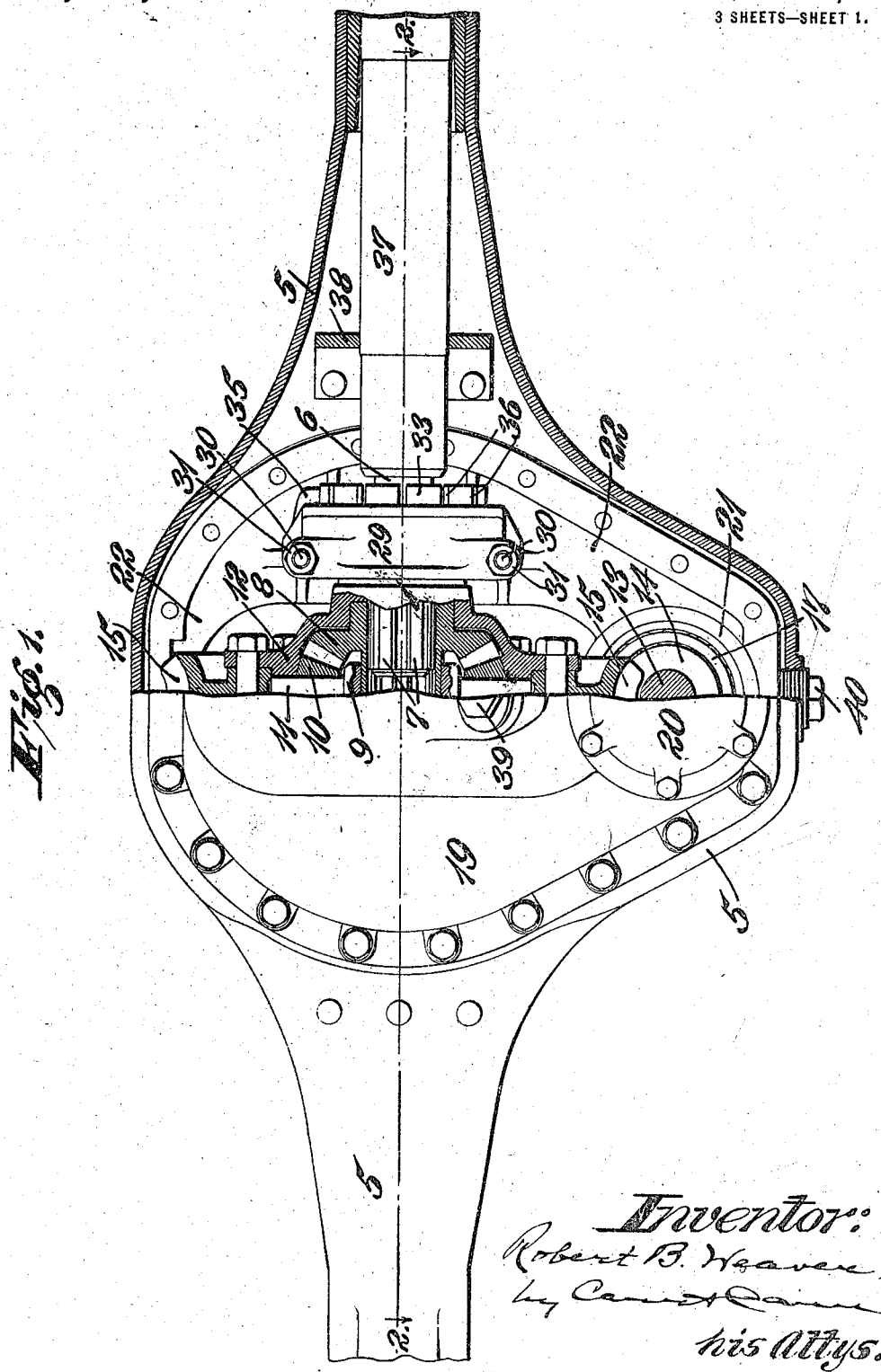

The driving axle shown in Figs. 1 to 3 of the drawings is mounted for rotation in a substantially rectangular axle casing 5, the wheels of the vehicle not being shown. The axle casing 5 is enlarged at its middle, thus forming a chamber for the worm wheel and differential bearings. The driving shaft sections 6 are located in the axle casing 5 with their outer ends projecting through the ends of the axle casing and carrying the road wheels (not shown) of the vehicle. The driving shaft sections are provided at their inner ends with ribs or teeth 7, which slidably engage corresponding grooves in the hubs of the two oppositely disposed beveled side gears 8 of the differential gear for rotation thereby. The side gears 8 of the differential are journaled in the spider 9, which carries the small beveled pinions 10 of the differential gear. These pinions revolve on the outwardly projecting arms 11 of the spider 9. The ends of the arms 11 of the spider 9, upon which the pinions 10 of the differential gear revolve, are seated in the differential gear case 12. The differential gear case is split perpendicularly to the axle and completely incloses all parts of the differential gear.

The differential gear case is driven from the propeller shaft 13 by means of a worm 14 formed thereon, which meshes with a worm gear 15 secured to the differential gear case. The worm gear 15 is positioned between the annular flanges formed on each section of the differential gear case and is held in position by bolts, which also hold the two sections of the differential together. The worm shaft is journaled in tapered roller bearings 16 and 17 located at each end thereof. The bearing 16 at the rear end of the worm shaft is mounted in a journal-box 18 formed in the rear cap 19 and is held in place by a cap 20, which also closes the open end of the journal box, and is preferably bolted to the rear cap. The rear cap 19 closes the opening in the rear face of the axle housing 5 to which it is secured by bolts. The forward bearing 17 is mounted in a journal-box 21 formed in the gear carrier 22, which is removably secured by bolts to the front face of the axle housing and closes the opening formed therein. An adjusting sleeve 23 is threaded into the open end of the journal-box 21 formed in the gear carrier for the forward bearing of the worm shaft. This sleeve engages the bearing cup 24 of the bearing 17 and can be adjusted to take up the wear in both of the worm shaft bearings. The wall of the journal-box in which the sleeve 23 is threaded is split for a short distance from the end and the sleeve can be locked in adjusted position by a clamping bolt 25 and detent 26. The detent has a finger which engages the adjacent notch of a series formed in the ends of the sleeve 23. The differential gear casing is provided with hub portions, which receive the inner ends of the axle sections. Located on the hub portions of the differential gear casing are bearings 27, which support the differential and worm gear. These bearings are mounted in split journal-boxes 28 formed integral with the gear carrier and are provided with removable caps 29, which are held in place by studs 30. These studs are threaded into the journal-boxes and are provided with nut-shaped shouldered portions 31 which bear against the caps, thus holding them in place. The studs project beyond the nut-shaped shouldered portions 31 into holes drilled in bosses 32 formed in the rear cap 19. The bosses 31 formed in the cap 19 support and stiffen the projecting ends of the studs. This cap also contains the journal-box 21 for supporting the rear end of the worm shaft. The journal-boxes 28 which are integral with the gear carrier and support the bearings for the worm gear and differential, are properly braced by ribs. This, coupled with the support for the projecting ends of the studs formed by the bosses, results in a rigid support for the differential and the worm gear and prevents distortion under load.

Any wear that occurs in the bearings 27 located on the hub portion of the differential gear case can be taken up by adjusting the rings 33, which are threaded into the journal-boxes 28 of the gear carrier 22 and engage the cups 34 of the bearings 27. The rings are locked in adjusted position by a detent 35, which is clamped between each of the journal-boxes 28 and its cap 29 by the studs 30 and is provided with a finger which engages one of a series of notches 36 formed in each of the rings.

The axle housing is provided with tubular end sleeves 37 which encircle the axle section and are carried in close to the differential gear. These sleeves pass through and are supported at their inner ends by rigid reinforcing plates 38, which extend across the axle housing and have their flanged portions riveted to the top and bottom walls of the axle casing. At their outer ends, these sleeves carry the wheel bearings (not shown) and also prevent oil in the center of the axle casing from reaching the brake linings. The plates, which connect the walls of the axle casing, act as trusses and greatly strengthen the axle casing, resulting in a rigid support for the carrier, which contains the differential gearing and worm gear. An oil filling thimble 39 is screwed into the rear cap 17 and permits the central portion of the axle casing to be filled to the proper level with oil, thus forming an oil bath for the worm gear, the worm and its bearings. A removable stopper 40 is screwed into the under side of the axle housing for draining the oil when necessary.

The modified form of journal-box 41 shown in Fig. 4 of the drawings is shown in the form of a detachable piece and is attached to the main body of the gear carrier 22 by bolts 43. The journal-box cap is the same as is used in the construction shown in Figs. 1 to 3. The bolts 43 extend through bosses formed in the inner face of the gear carrier, thence through the journal-box and cap. Nuts 44 are threaded on the end portion of the bolts for securing the journal-box and cap in position and are locked in position by lock washers. The bolts project beyond the nuts and are supported in holes drilled in bosses formed in the rear cap in the same manner as the studs 30, shown in Figs. 1 to 3.

The device described in the foregoing specification is adapted to be used in connection with pleasure vehicles where the worm is located underneath the worm gear to give the desired body clearance, but I do not wish to be limited to the construction, as in commercial vehicles the worm may be located above the worm gear, to give a straight line drive.

Some of the advantages of the foregoing construction are, namely: a light rigid structure made up of a combination of parts, which can be easily machined; division of the device into parts rendering its manufacture economical; the removable cap whereby the bearings can be adjusted and the worm and gear repaired without removing the axle; and the proper bracing of the journal-boxes carried by the gear carrier, which support the differential and worm gear bearings to prevent distortion under load.

The foregoing arrangement is considered only as an example and as being the one best adapted to the construction shown, but the invention is not limited thereto, and the differential casing may be rotated by beveled gearing or in any desired manner.

I claim the following as my invention:

1. A driving axle comprising an axle casing having an enlarged middle portion provided with alined openings, driving axle sections arranged in said axle casing, a cap removably secured to one side of said axle casing and adapted to close one of said openings, a gear carrier removably secured to the other side of said axle casing and adapted to close the other of said openings, said gear carrier having two journal boxes projecting into said casing in alinement with the driving axle sections, a differential gear case journaled in said journal boxes, a worm driving gear secured to said gear case, a worm drive shaft meshing with said worm gear, bearings for said worm shaft, one of said bearings being journaled in the gear carrier and the other of said bearings being journaled in the cap secured to the axle casing.

2. A driving axle comprising an axle casing having alined openings at its middle, driving axle sections arranged in said axle casing, a cap secured to one side of said axle casing and adapted to close one of said openings, a gear carrier secured to the opposite side of said axle casing and adapted to close the other of said openings, a differential gear case removably supported in the axle casing, the gears in said gear case being operatively connected to the driving axle sections, a worm gear secured to said differential gear case, a worm drive shaft for driving said worm gear, and bearings for said differential gear case and worm drive shaft, the gear carrier having journal-boxes for supporting the bearings for the differential gear case and a journal-box for supporting one of the bearings for the worm shaft, the other of said bearings for said shaft being journaled in a journal box formed in the cap and being adjustable so as to take up the wear in both of the worm shaft bearings.

3. A driving axle comprising an axle casing having its middle portion enlarged and provided with openings in the front and rear walls thereof, a cap secured to said rear wall for closing the opening therein, a gear carrier secured to the front wall of said axle casing and adapted to close the opening therein, said gear carrier having journal-boxes projecting through said last mentioned opening in longitudinal alinement, a differential gear case having hub portions journaled in adjustable bearings in said journal boxes, removable caps for said journal-boxes, studs for securing said caps in position, said studs having projecting portions, which are supported in bosses formed in the cap secured to the rear of the axle casing.

4. A driving axle comprising a casing having its middle portion enlarged and provided with alined openings in the front and rear wall thereof, axle sections arranged therein, a cap secured to the rear wall for closing the opening formed therein, a gear carrier secured to the front wall and adapted to close the opening in said wall, journal-boxes secured to said gear carrier in longitudinal alinement, a differential gear case having hubs journaled in combined radial and thrust bearings in said journal-boxes, means for adjusting said bearings lengthwise of the axle, spaced annular flanges on said differential gear case, a driving gear adapted to be positioned between said flanges, bolts for clamping the driving gear between the annular flanges on the differential gear case, a worm drive shaft having its ends journaled in combined radial and thrust bearings, the journal-box for one of said bearings being located in the cap secured to the rear of the axle casing and the journal-box for the other of said bearings being located in the gear carrier, the last mentioned bearing being adjustable lengthwise of the worm shaft to take up wear in both of said bearings.

5. A driving axle comprising an axle casing having an enlarged portion with openings in its front and rear wall, a cap secured to said casing around the opening in its rear wall, a gear carrier secured to the axle casing around the opening in its front wall, journal-boxes secured to said gear carrier and extending into said axle casing in longitudinal alinement, a differential gear case having hubs journaled in said journal-boxes, caps for said journal-boxes, means for securing the journal-boxes and caps to the gear carrier, said means extending past the cap and being rigidly supported by the rear cap of the axle casing, driving shafts arranged in the axle casing and extending into the differential gear case for engagement with the gears therein, sleeves surrounding the axle section and arranged on each side of the journal-boxes for the differential gear case, plates for supporting the inner ends of said sleeves, said plates being secured to the top and bottom walls of the axle casing to reinforce said axle casing.

6. A driving axle comprising an axle casing having an enlarged middle portion with openings in its front and rear wall, axle sections arranged in said axle casing, a rear cap for closing the opening in the rear wall of the axle casing, a gear carrier secured to the front wall of the axle casing and adapted to close the openings therein, said gear carrier having journal-boxes projecting into said axle casing, means for supporting the journal-boxes from the cap secured to the rear of the axle casing, a differential case arranged between said journal-boxes and having hubs journaled therein, an oil filling thimble located in the cap secured to the rear of the axle casing, the level of the oil in the enlarged portion of the axle casing being controlled by the height of the filling thimble, and a stopper threaded into the bottom of the axle casing, whereby the oil may be drained.

Signed at Detroit, Michigan, this 3rd day of November, 1917.

ROBERT B. WEAVER.